UNITED STATES PATENT OFFICE.

KNUD ERSLEV, OF NIJMEGEN, NETHERLANDS.

MANUFACTURE OF MARGARIN.

1,232,016.     Specification of Letters Patent.     Patented July 3, 1917.

No Drawing.     Application filed March 11, 1916. Serial No. 83,551.

*To all whom it may concern:*

Be it known that I, KNUD ERSLEV, a subject of the King of Denmark, residing at Nijmegen, the Netherlands, have invented certain new and useful Improvements in the Manufacture of Margarin, of which the following is a specification.

In manufacturing margarin in the usual way, buttery aroma is imparted thereto by mixing and working into an emulsion therewith, milk, cream, or the like, in which an aromatic flavor has been developed by fermentation, a further quantity of such aromatized milk, cream, or the like, being, if necessary, added to the finished margarin. The aromatized flavoring substances which are developed by such additions are volatile, and liable to readily alter, when the margarin is kept for some time, and care has to be taken that in the finished margarin an after fermentation will take place to form further aromatic substances, but, although in this way the objections are met to a certain extent, they are not completely overcome, and it has been one of the most important problems to satisfactorily retain the buttery aroma imparted to the margarin.

According to my United States Patent No. 1,147,626 this problem is satisfactorily solved by the addition of a lactate of an alkali to the fat.

I have now found that the buttery aroma can also be very efficiently and economically preserved by adding an alkali salt of a saturated unoxidized aliphatic acid. The alkali salts employed should, of course, be innocuous as food, and therefore salts of ammonia are not intended to be covered by the claims under this application. Lactate of alkali, which has been claimed in my aforesaid patent, may, if desired, be used in admixture with the other salts and such use is not excluded from my claims. Especially suitable I have found to be an alkaline acetate or an alkaline formate, or an alkaline propionate, or mixtures of two, or more, of these; and such mixtures are included in the claims. To be useful for the purpose of my invention the salt, or salts, employed should be sufficiently soluble in water to produce the desired effect.

In carrying out the invention an aforesaid salt, or a mixture of such salts, is added to the fat which has been emulsified with the fermented aromatized milk, cream, or the like, the mass after cooling being freed from an excess of water by rolling, kneading, or other suitable means. The said salt, or mixtures of salts, can be added in the condition of a fine powder, or as a concentrated solution together with the ingredients (such as egg yolk, cream, or the like), which may be added to the emulsion in the mixer.

The said salt, or mixture of salts may be added to the fat in different quantities, according to the effect required. The quantity employed should preferably be not less than one half of one per cent. relatively to the fat. As a rule one per cent. is sufficient, but sometimes as much as two per cent. may be used. If desired common salt can be added as usual in addition to the aforesaid salt, or mixture of salts.

What I claim is:—

1. In the manufacture of margarin, the addition of an alkali acetate for the purpose of preserving the buttery aroma of the margarin.

2. In the manufacture of margarin the addition of an alkali acetate, in amount not less than one half of one per cent. relatively to the fat, for the purpose of preserving the buttery aroma of the margarin.

In testimony whereof I affix my signature in presence of two witnesses.

KNUD ERSLEV.

Witnesses:
    H. F. KOOP,
    A. C. NELSON.